(12) United States Patent
Kral

(10) Patent No.: US 6,460,641 B1
(45) Date of Patent: Oct. 8, 2002

(54) MID-WHEEL DRIVE WHEELCHAIR WITH FRONT WHEEL MULTIPLE BIAS SUSPENSION AND ANTI-TIP ASSEMBLY

(75) Inventor: Stephen L. Kral, Olmsted Falls, OH (US)

(73) Assignee: Invacare Corporation, Elyria, OH (US)

( * ) Notice: Subject to any disclaimer, the term of this patent is extended or adjusted under 35 U.S.C. 154(b) by 0 days.

(21) Appl. No.: 09/607,468

(22) Filed: Jun. 29, 2000

(51) Int. Cl.[7] .................................................. B60G 5/00
(52) U.S. Cl. ................................ 180/24.02; 280/250.1; 280/755; 280/304.1; 180/907; 180/209; 180/9.32
(58) Field of Search .............................. 280/250.1, 211, 280/214, 43, 755, 304.1, DIG. 10; 180/907, 209, 6.5, 11, 12, 23, 24, 65.1, 65.6, 8.2, 9.32, 24.02, 22; 267/166, 167, 151, 152, 153

(56) References Cited

U.S. PATENT DOCUMENTS

| | | | |
|---|---|---|---|
| 3,682,462 A | * 8/1972 | Papousek | 267/34 |
| 3,862,751 A | * 1/1975 | Schwaller | 267/91 |
| 4,118,020 A | * 10/1978 | Myers | 267/168 |
| 4,455,031 A | 6/1984 | Hosaka | 280/242 |
| 4,513,832 A | 4/1985 | Engman | 180/6.5 |
| 4,720,223 A | * 1/1988 | Neights et al. | 411/11 |
| 4,862,983 A | * 9/1989 | Kreft | 180/89.13 |
| 4,905,972 A | * 3/1990 | Scowen | 267/152 |
| 5,435,404 A | 7/1995 | Garin, III | 180/6.5 |
| 5,482,261 A | * 1/1996 | Ortega | 267/168 |
| 5,772,237 A | * 6/1998 | Finch et al. | 280/704 |
| 5,848,658 A | * 12/1998 | Pulver | 180/65.1 |
| 5,851,019 A | * 12/1998 | Gill et al. | 280/286 |
| 5,855,387 A | * 1/1999 | Gill et al. | 280/283 |
| 5,899,475 A | * 5/1999 | Verhaeg et al. | 280/250.1 |
| 5,944,131 A | 8/1999 | Schaffner et al. | 180/65.1 |
| 5,964,473 A | 10/1999 | Degonda et al. | 280/250.1 |
| 6,041,876 A | * 3/2000 | Pulver et al. | 180/65.1 |
| 6,070,898 A | * 6/2000 | Dickie et al. | 280/304.1 |
| 6,079,698 A | * 6/2000 | Patterson et al. | 267/33 |
| 6,079,725 A | * 6/2000 | Lazaros | 280/250.1 |

\* cited by examiner

Primary Examiner—Brian L. Johnson
Assistant Examiner—J. Allen Shriver
(74) Attorney, Agent, or Firm—Hudak & Shunk Co., L.P.A.

(57) ABSTRACT

A wheelchair has a plurality of central wheels which can be either power or manually driven, at least one rear caster wheel, and at least one resiliently biased ground engaging front wheel having a multiple suspension assembly. The wheelchair has improved tracking since the front wheel is maintained on the ground even on undulating, bumpy, or irregular surfaces. The wheelchair also has improved stability since the front ground engaging wheel also acts as a resiliently biased anti-tip wheel.

22 Claims, 8 Drawing Sheets

US 6,460,641 B1

MID-WHEEL DRIVE WHEELCHAIR WITH FRONT WHEEL MULTIPLE BIAS SUSPENSION AND ANTI-TIP ASSEMBLY

FIELD OF THE INVENTION

The present invention relates to a wheelchair having a main wheel such as a manual or powered mid-wheel drive wheel and also having at least one ground engaging front wheel containing a multiple biased suspension and anti-tip assembly.

BACKGROUND OF THE INVENTION

Heretofore, mid-wheel drive wheels have had a front anti-tip wheel located up off or above the ground such as in the wheelchair disclosed in U.S. Pat. No. 5,944,131. Alternatively, U.S. Pat. No. 5,435,404 to Garin discloses a ground engaging front wheel and a rear caster wheel preferably attached to a vertically pivotal swing arm.

SUMMARY OF INVENTION

A mid-wheel drive wheelchair (either manual or power) has at least one resiliently biased ground engaging front wheel having a multiple suspension assembly to improve tracking upon undulating or irregular surfaces as well as improved anti-tip stability. The front wheel is a caster wheel pivotally attached to an arm directly or indirectly connected to the wheelchair frame. The front wheel desirably contains a dual spring suspension system wherein a primary spring has a preset compression and wherein a secondary spring has an adjustable compression to accommodate a range of individual body weights and personal performance preferences with regard to anti-tipping of the wheelchair. The secondary spring can be adjustable so that the compression thereof can partially overlap, be sequential, or have separate range than the primary spring.

DETAILED DESCRIPTION OF THE INVENTION

Figure 1:
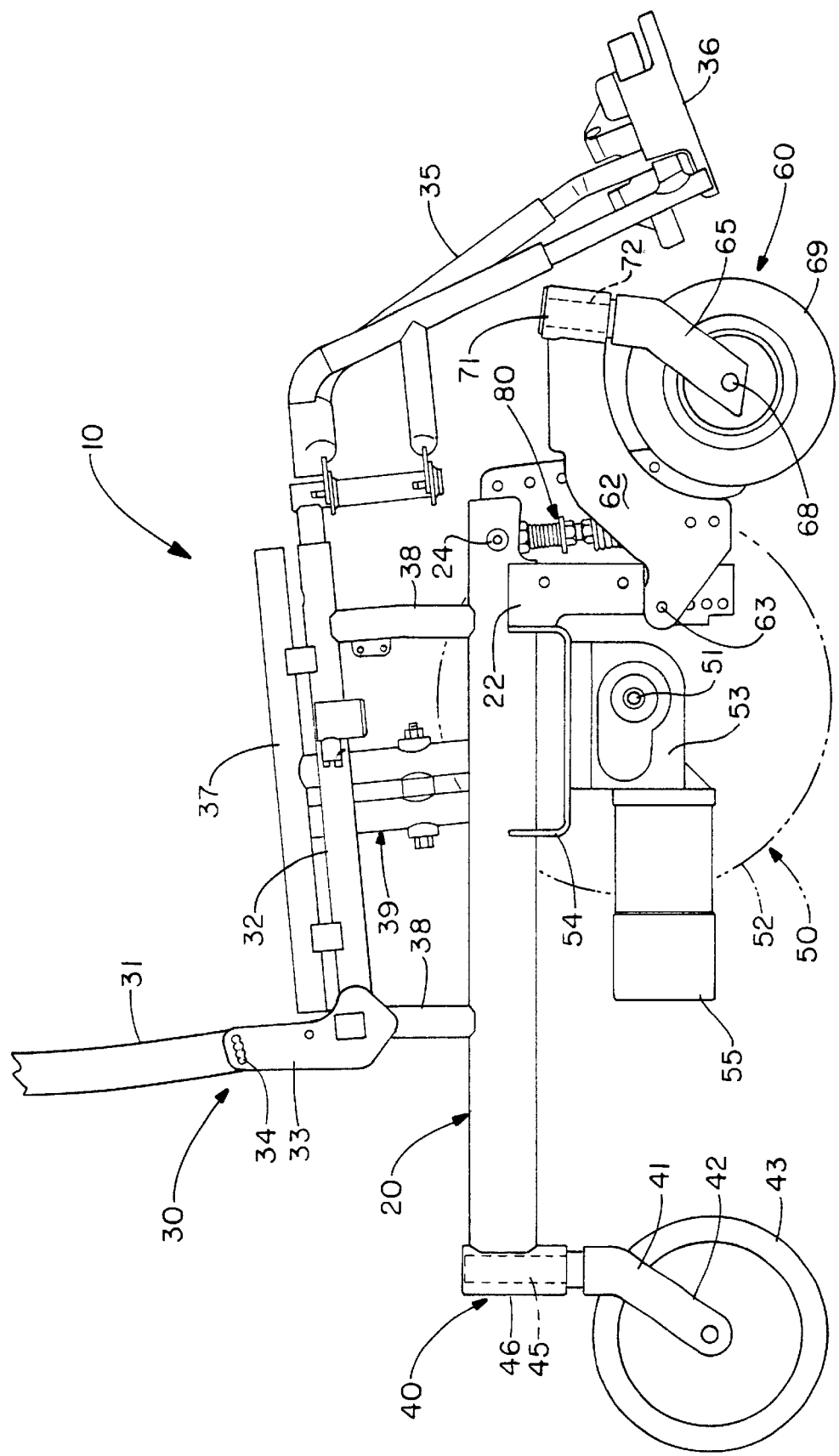
FIG. 1 is a side elevation view of a foldable mid-wheel drive wheelchair of the present invention having at least one resiliently biased ground engaging front caster wheel having a multiple bias suspension and anti-tip assembly.
Figure 2:
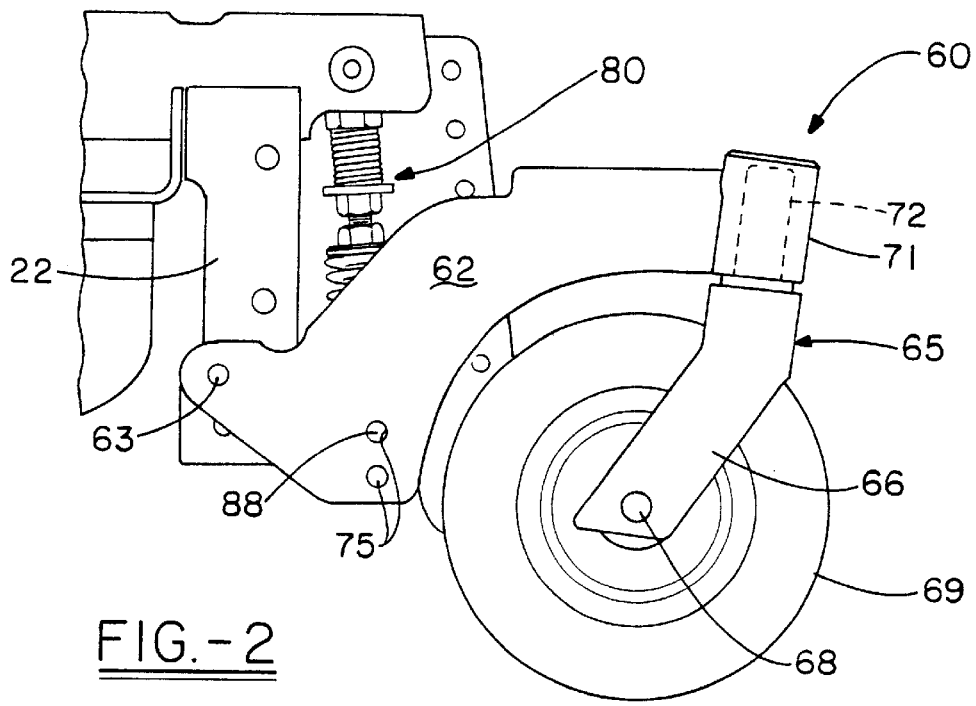
FIG. 2 is an expanded partial side elevation view showing the resiliently biased front caster ground engaging wheel containing a dual spring suspension and anti-tip assembly.

Referring to FIG. 1., the wheelchair of the present invention is generally indicated by the numeral 10 and has a main frame generally indicated by the numeral 20 and a seat frame generally indicated by the numeral 30. Seat back frame 31 supports the back of an individual seated within the wheelchair whereas base frame 32 is connected to seat bottom 37 which supports the lower portion of an individual including the buttocks and the thighs. Base frame 32 is connected to main frame 20 through seat frame supports 38. Back frame 31 is connected to base frame 32 by bracket 33 having a slot or opening 34 therein allowing back frame 31 to be reclined to various positions through any conventional manner such as a nut and bolt which can reside within in a plurality of positions of the bracket slot. In this embodiment of the present invention, the wheelchair is foldable as through cross brace 39. Leg rest frame 35 is located at a forward location of the base frame and can be connected to the base frame in any conventional manner. The leg rest frame has footrest 36 at the terminal lower end thereof. Footrest 36 is pivotally attached to leg rest frame 35 which in turn is pivotally attached in generally an upward and downward direction to the seat base frame. Generally, connected to the rear end or portion of the main frame is at least one and preferably two rear caster wheel assemblies generally indicated by the numeral 40. The caster wheel assembly contains caster fork 41 having longitudinal offset 42 therein. Fork stem 45 resides within housing 46 which is directly connected to main frame 20. Rear caster wheel 43 is pivotally attached to the lateral offset and thus trails the substantially vertical housing 46 when the wheelchair is moving forward.

Figure 3:
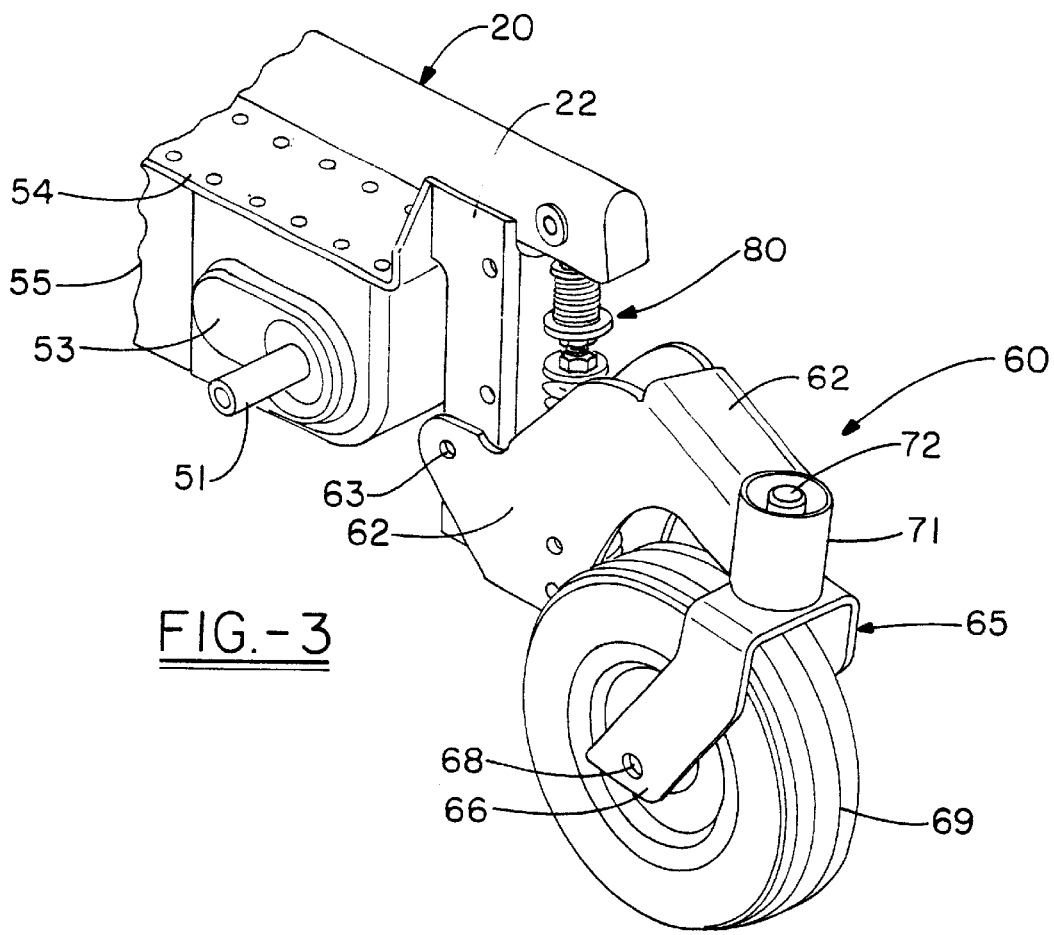
FIG. 3 is essentially a perspective view of the resiliently biased ground engaging front caster wheel assembly shown in FIG. 2.
Figure 4:
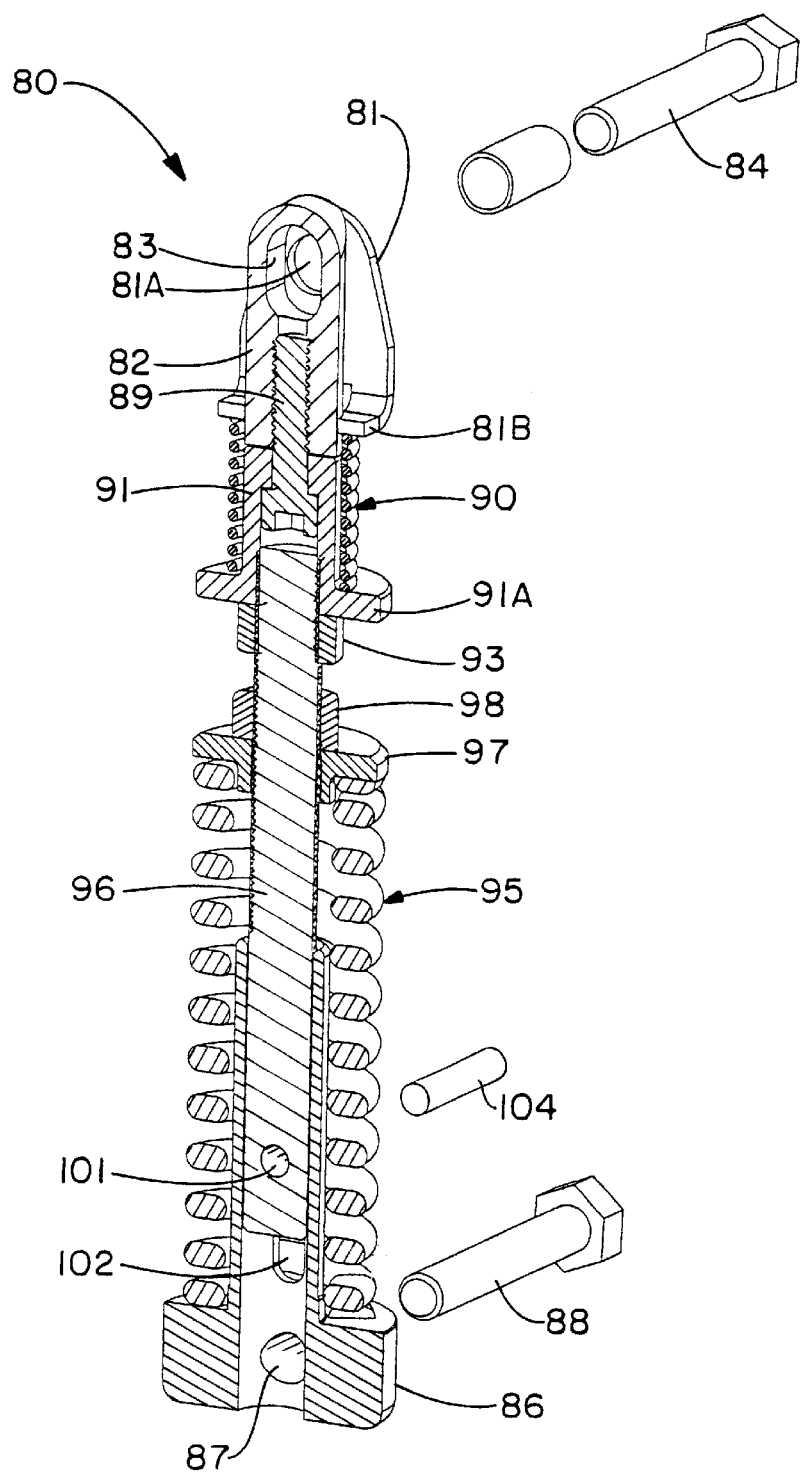
FIG. 4 is a cross-sectional perspective view of the dual spring suspension and anti-tip assembly.
Figure 5:
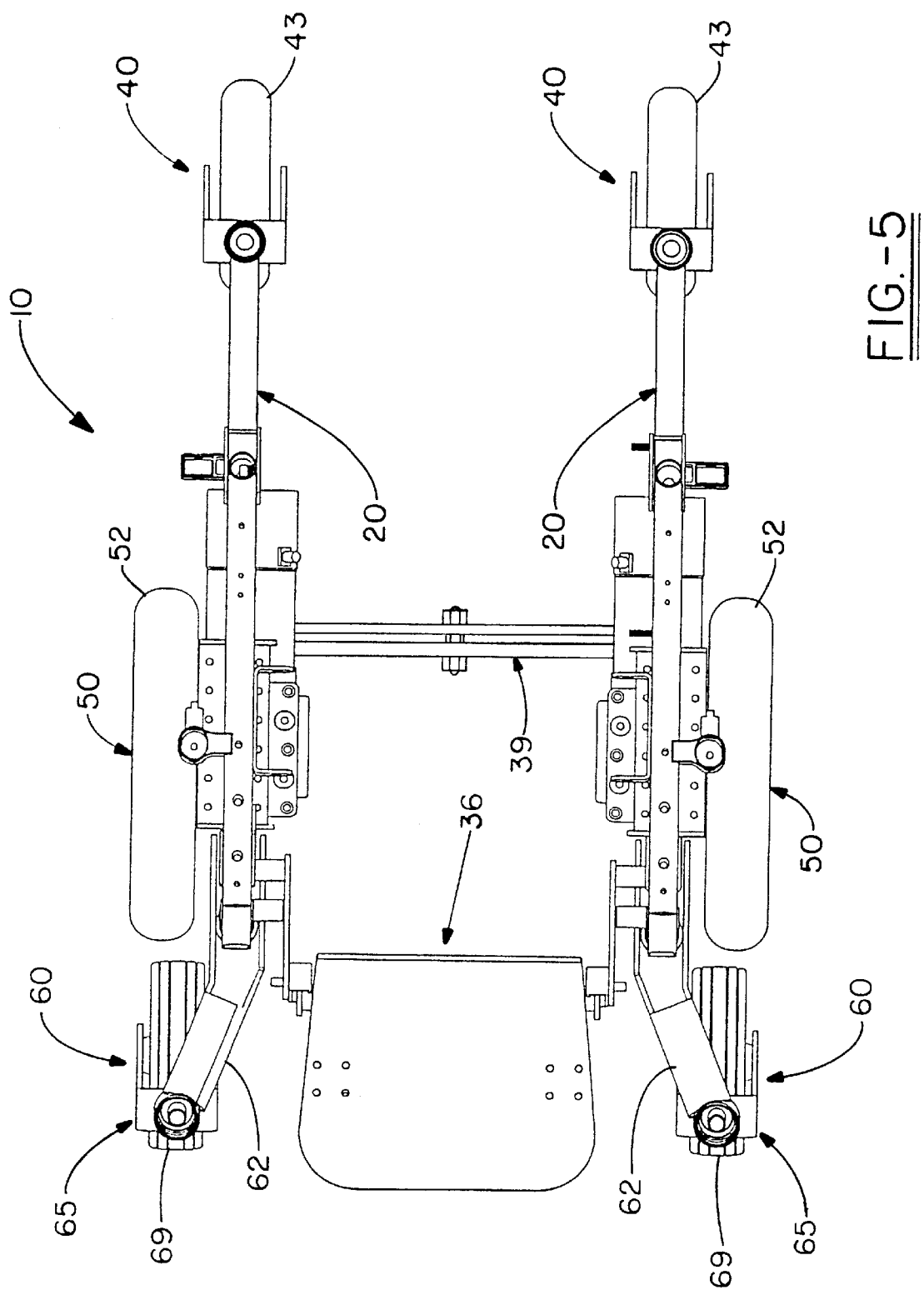
FIG. 5 is a top plan view of the present invention showing two main drive wheels, two front resiliently biased ground engaging wheels, and two rear caster wheels.

As best seen in FIGS. 1 and 3, main drive wheel assembly, generally indicated by the numeral 50, which can either be manually driven or power driven as by a battery powered motor, contains an axle 51 about which wheel 52, shown in phantom, rotates. Gear box 53 is connected to main frame 20 in any conventional manner such as through gear box mounting bracket 54. Desirably, main or central drive wheel 52 of the present invention is power driven and hence the wheelchair contains motor 55 which through gear box 53 drives axle 51 to cause the main wheel to rotate generally in a forward direction, as well as sometimes in a rearward direction as upon turning the wheelchair while maintaining the same in essentially one location. As apparent from FIGS. 1 and 5, main drive wheel assembly 50 and especially axle 51 is desirably located generally beneath or slightly forward of an individual's center of gravity so as to enable the wheelchair to have a short turning radius. That is, a large or major amount of the weight of an individual as well as the wheelchair is carried by main wheels 52 as generally from about 70% to about 90% and desirably from about 80% to about 85% by weight with approximately 2, 3, or 5% to about 28% of the total weight being carried by rear caster wheels 43 and the remaining approximately 2 or 3% to about 5 or 10% being carried by resiliently biased ground engaging front wheel 69. All weight percents are measured on a level surface.

Front caster assembly, generally indicated by the numeral 60, contains generally longitudinal caster arm 62 which pivots about pivot point 63 which can be a pin that is connected to the lower portion of a downwardly extending frame leg 22. Rotation of caster arm 62 about pivot point or pin 63 is in a substantially vertical plane. The forward portion of caster arm 62 includes caster fork 65 having longitudinal offset 66 thereon with axle 68 located in the lower extremity thereof. The front caster wheel 69 resides upon axle 68 and thus rotates within caster fork 65. As with the rear caster wheel, the longitudinal offset of the front caster fork permits caster wheel 69 to trail the upper substantially vertical arm thereof which through head tube 71 and fork stem 72 is pivotally connected to the caster arm. This arrangement prevents fluttering of the wheels. Unlike rear fork stem 45, front fork stem 72 is desirably inclined rearwardly with respect to the vertical, such as from about 0 or 1 to about 25 degrees, typically from about 0 or 3 to about 15 degrees and preferably from about 0 or to about 9 degrees, to facilitate the front caster wheel in going over large obstacle such as a curb, or the like.

The multiple suspension anti-tip assembly, generally indicated by the numeral 80, can have two or more resiliently biasing members with two springs being desired. That is, primary spring 90 and secondary spring 95 which preferably are axially aligned. The dual spring suspension assembly has upper bracket 81 containing hole or aperture 81A therein which rotatably receives upper pin 84 therein. Upper pin 84 connects the upper portion of dual spring suspension assembly to generally the front end of main frame 20 as at aperture 24 thereof. The lower portion of the multiple suspension assembly contains base 86 which has aperture 87 therein which in turn rotatably or pivotally receives lower pivot pin 88. Pivot pin 88 connects the lower portion of the dual spring suspension assembly to front caster arm 60 generally at a point forward caster pivot pin 63 as at aperture 75. A plurality of lower suspension pivot apertures 75 generally exist within the caster arm in order to provide an alternative point of connection as when different size, i.e. larger or smaller, drive wheels are utilized. Accordingly, the existence of different apertures 75 allows caster arm 60 to be properly located relative to the ground.

Primary spring 90 is located between upper bracket flange 81B and lower flange 91A of length adjuster 91. Desirably, primary spring 90 resides annually about length adjuster 91. The compression of the primary spring is generally set at the factory inasmuch as flange 91A is located at a predetermined distance on length adjuster 91 to yield a predetermined resistance or bias. Since length adjuster 91 is threadably received by the suspension assembly shaft 96 and the upper portion thereof essentially contacts upper primary spring housing 82, rotation thereof causes upper housing 82 and corresponding housing slot 83 to move vertically either upwardly or downwardly. This adjustable feature permits the overall length of the dual suspension assembly to be adjusted when the same is installed on a wheelchair to generally compensate for variations in the length of the various parts forming caster arm 60 and the like while not changing the compression of primary spring 90 Thus, when properly adjusted upper pin 84 is desirably located within the vertical central portion of housing slot 83 of primary spring housing 82. Upper pin 84 can move generally vertically upwardly or downwardly within elongated upper housing slot 83 since upper bracket 81 moves independent of housing 82. The tension or compression of primary spring 90 is generally set so that when front caster arm assembly 60 is installed on a wheelchair and engages the ground, it biases the front caster wheel against a riding surface. Cap screw 89 generally exists within a portion of length adjuster 91 and upper spring housing 82 to permit the same to rotate or swivel with respect to one another.

Shaft 96, which is reciprocally and axially located within lower base 86, has threads at the upper end thereof which engage primary length adjuster locknut 93 as well as secondary spring locknut 98. Through washer 97, the compression to secondary spring 95 can be adjusted by proper rotation of preload locknut 98 about shaft 96.

Shaft aperture 101 is located at the lower end of shaft 96 and receives shaft pin 104 therein. Pin 104 limits the movement of shaft 96 within base slot 102 so that upon rotation of preload nut 98, a desired compression or pressure is applied to secondary spring 95.

Base slot 102 further provides a travel distance for shaft 96 to move in a generally vertical direction when secondary spring 95 is compressed with regard to providing an anti-tipping force as explained herein below.

Figure 6A:
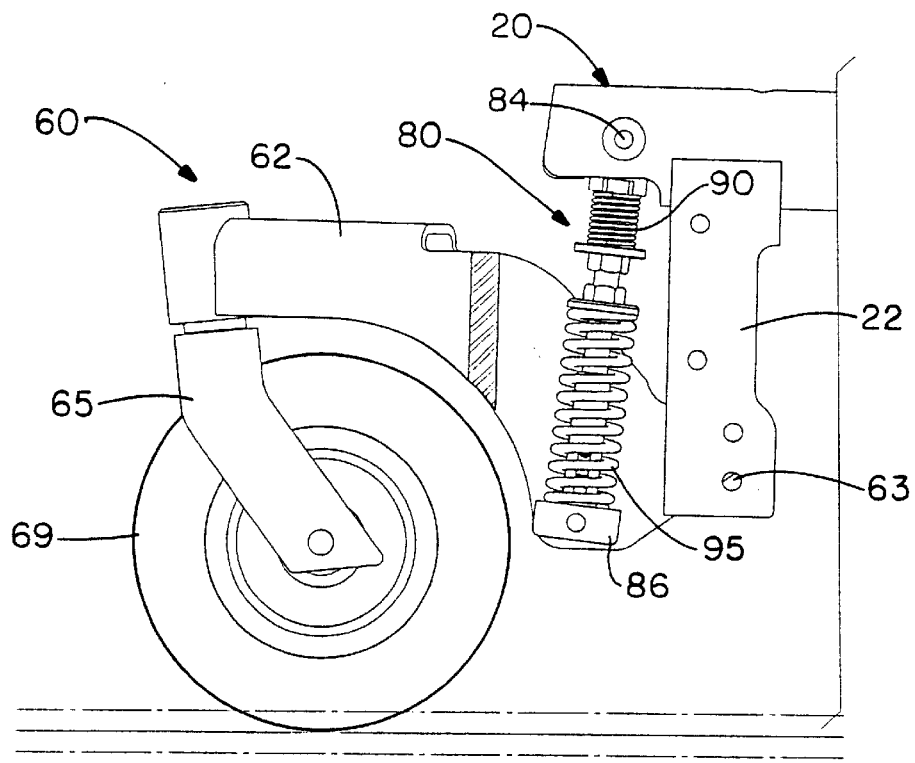
FIG. 6A is a side elevation partial cross-sectional view showing the front anti-tip wheel on a normal surface.
Figure 6B:
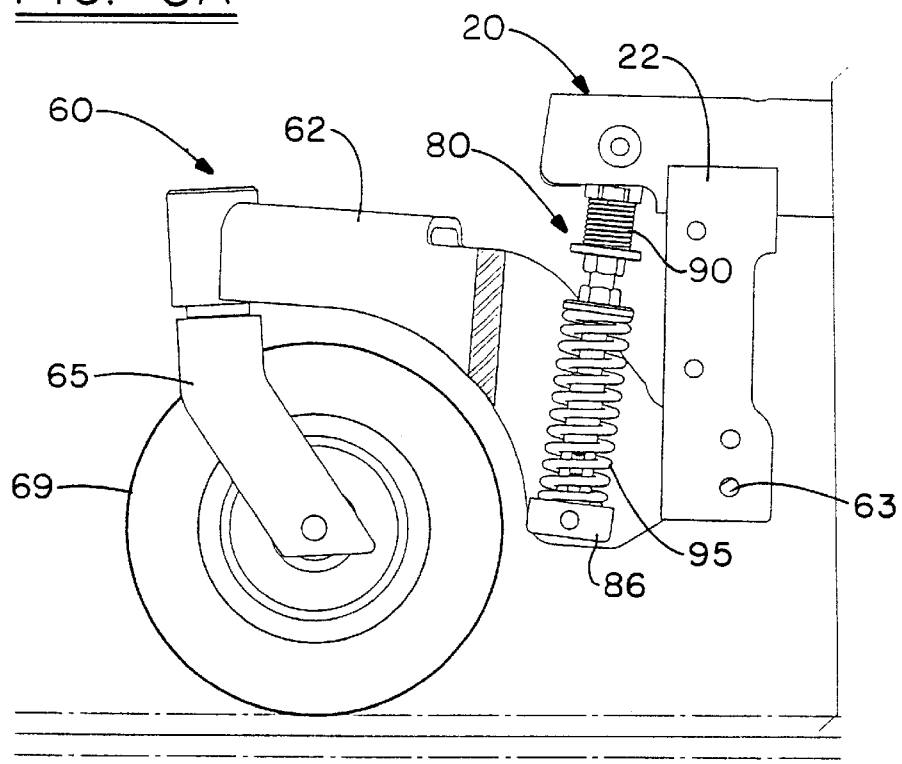
FIG. 6B is a side elevation partial cross-sectional view showing the front anti-tip wheel on a raised surface with the primary spring being compressed.

Under normal operating conditions, the wheelchair will travel forward with all six wheels upon the ground. The two main drive wheels 50, whether manually or power operated, will propel the wheelchair along the ground with directly connected rear caster wheels 43 trailing. Front caster wheels 69 will move along a surface as shown in FIG. 6A. When a surface irregularity such as an elevated portion, a bump or obstacle is encountered, front caster wheel will be raised upwardly with the force of the obstacle being transferred through wheel 69, through caster fork 65, and through caster arm 62 which will pivot upwardly about front caster assembly pivot point 63. The upward force of the caster arm is then transferred to lower base 86 of the dual spring suspension assembly. The upward force is then transferred from base 86 through secondary spring 95 and through washer 97 and preload nut 98 to shaft 96. Shaft 96 is thus caused to move upward whereby through the threaded engagement with lock nut 93 and flange length adjuster 91A, force is applied to primary spring 90. The spring is caused to compress against flange 81B of upper bracket 81 since the bracket is maintained in a fixed position through upper pin 84 which is secured to the wheelchair frame. Since secondary spring 95 has much more resistance than thinner, more easily compressable primary spring 90, primary spring 90 will continue to compress or collapse until length adjuster 91A through contact with upper housing 82 moves housing slot 83 upward until the bottom of the slot rests against pivot pin 84 as shown in FIG. 6B. At this point, primary spring 90 can no longer compress and any subsequent vertical motion will then be derived from secondary spring 95.

Figure 6C:
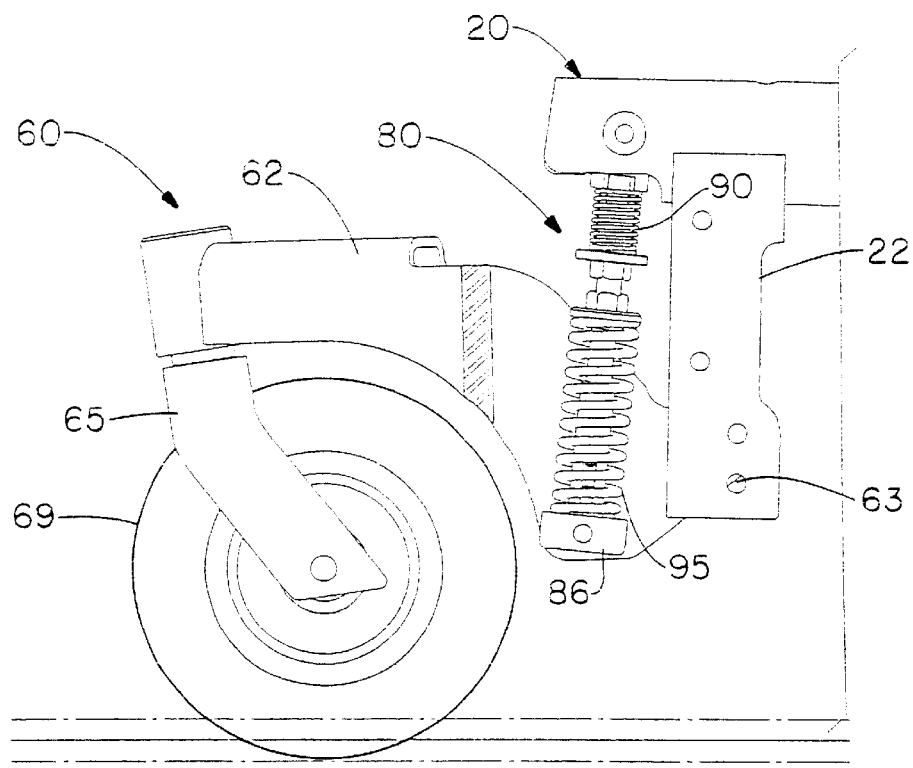
FIG. 6C is a side elevation partial cross-sectional view showing the front anti-tip wheel in a depressed position with the primary spring being in an elongated position.

Depending upon pressure of primary spring 90 which is preset before installation of the dual spring suspension assembly, various resilient bias pressures can be exerted by primary spring 90 during normal operating conditions such as, for example, from about 30 pounds to about 50 pounds, plus or minus 5 pounds. Desirably, the compression on primary spring 90 is such that upper pivot pin 84 is located in approximately the center portion of housing slot 83 when the wheelchair is stationary with an occupant residing therein. The front caster wheel will then track over slightly irregular surfaces containing undulations therein. That is, should the front caster wheel encounter a slight bump, the force will be transferred through the dual spring suspension assembly as noted above and through compression of primary spring 90 to cause pivot pin 84 to approach the bottom of pivot slot 83 of upper housing 82 as shown in FIG. 6B. The reaction force of primary spring 90 will thus apply pressure to the front caster wheel to maintain the same on the ground or obstacle and thereby maintain or provide tracking ability of the wheelchair. Alternatively, when front caster wheel 69 encounters a depression in the surface, the compression of primary spring 90 will force caster wheel 69 downwardly into the depression such that pin 84 will rise upwardly or vertically within housing slot 83 as shown in FIG. 6C. In either event, the biasing force of the primary spring causes both front caster wheels to remain on the ground or the travel surface and cause the same to maintain the tracking ability of the wheelchair.

Figure 6D:
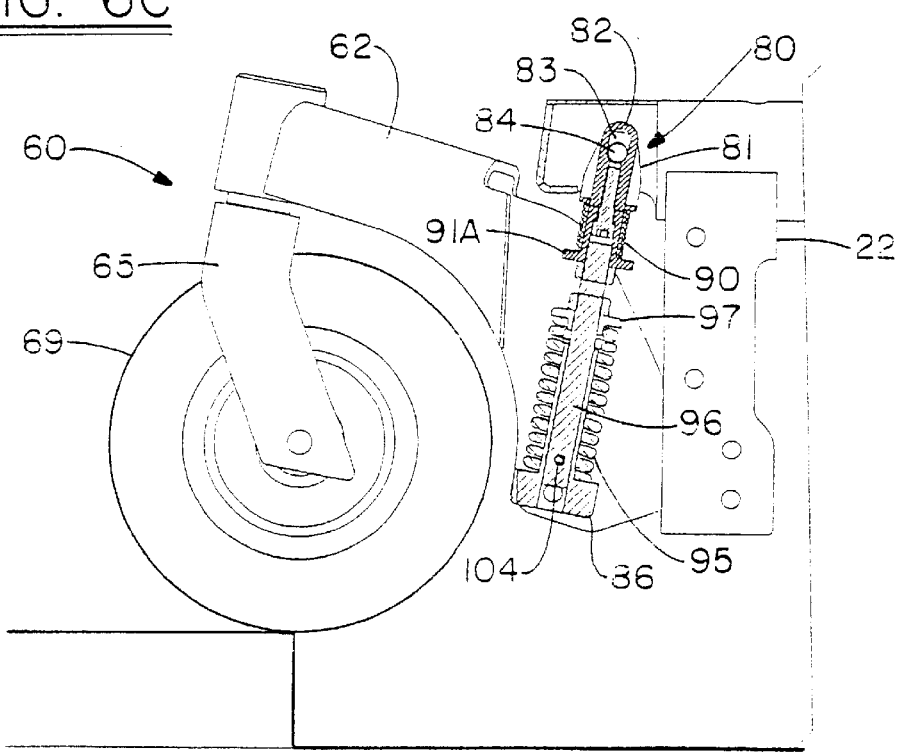
FIG. 6D is a side elevation partial cross-sectional view showing the front anti-tip wheel in a raised position clearing a curb with the primary spring fully compressed and a secondary spring partially compressed.

Whether the secondary spring compression partially overlaps the compression range of the primary spring, whether it is sequential thereto, or whether it is operative at a higher pressure, is controlled by applying a predetermined pressure thereto by rotation of washer flange 97. If the secondary spring has a sequential compression range that commences upon the full compression of the primary spring, say at about 50 pounds, at such compression the secondary spring will start to compress and there is no longer any vertical take up by the primary spring assembly. Instead, the force transmitted by the obstacle is now resisted by washer flange 97 which serves to compress secondary spring 95 as shown in FIG. 6D. Secondary spring 95 will continue to be compressed until shaft pin 104 contacts the bottom portion of vertically elongated base slot 102. Depending generally upon the preset compression, the resistance of spring 95, and the like, different pressure resistances can be generated by spring 95 as from about 50 up to about 400 pounds. Should the obstacle force be greater than the bias resistance of secondary spring 95, which generally it is not, there will no longer be any give or resilient take up within the dual spring assembly. That is, the dual spring assembly will "bottom out" and the wheelchair frame will then move upwardly.

If a secondary spring compression range partially overlaps the compression range of the primary spring, vertical uplift caused by the obstacle will be partially taken up by the secondary spring in addition to the primary spring. However, if the secondary spring compression range is subsequent to that of the primary spring, there will be a null range in which no vertical uptake is made by the dual spring suspension assembly.

In the above noted manner, force from an obstacle is received and biasly resisted by the dual spring suspension assembly of FIGS. 1 through 6. Such resilient resistance is generally accomplished without moving the front portion of the wheelchair frame upward. Once the obstacle has been passed, the resiliently biased dual spring assembly will urge the front caster downward so it once again contacts the ground or bearing surface and maintain the caster in contact therewith.

A primary purpose of the front caster wheel is to prevent tipping of the wheelchair as upon a sudden stop, contacting a large obstacle, or the like. That is, in as much as a front caster wheel is always on the ground or surface as when a sudden stop or the like is made, the front caster wheel assembly functions as an anti-tipping wheel inasmuch as force is immediately applied, since the wheel is biased toward the ground or surface, to the wheelchair frame to keep the same from being tipped forward. The quicker the stop, the greater the resilient anti-tipping force applied through the dual spring suspension assembly to the frame to maintain the rear caster wheel on the ground or surface, or to minimize any tipping of the frame.

The wheelchair of the present invention has enhanced stability with regard to anti-tipping since as noted, the front caster wheels are always resiliently urged against the ground. There is no range of travel that the front caster wheels must move through before contacting the ground and applying an anti-tipping force. Momentum, inertia or kinetic energy is not permitted to build up before any reaction anti-tipping force is applied.

Other advantages of the multiple spring suspension assembly includes control of the wheelchair during downhill movement or on a transition ramp which results in better driveability.

Figure 7:
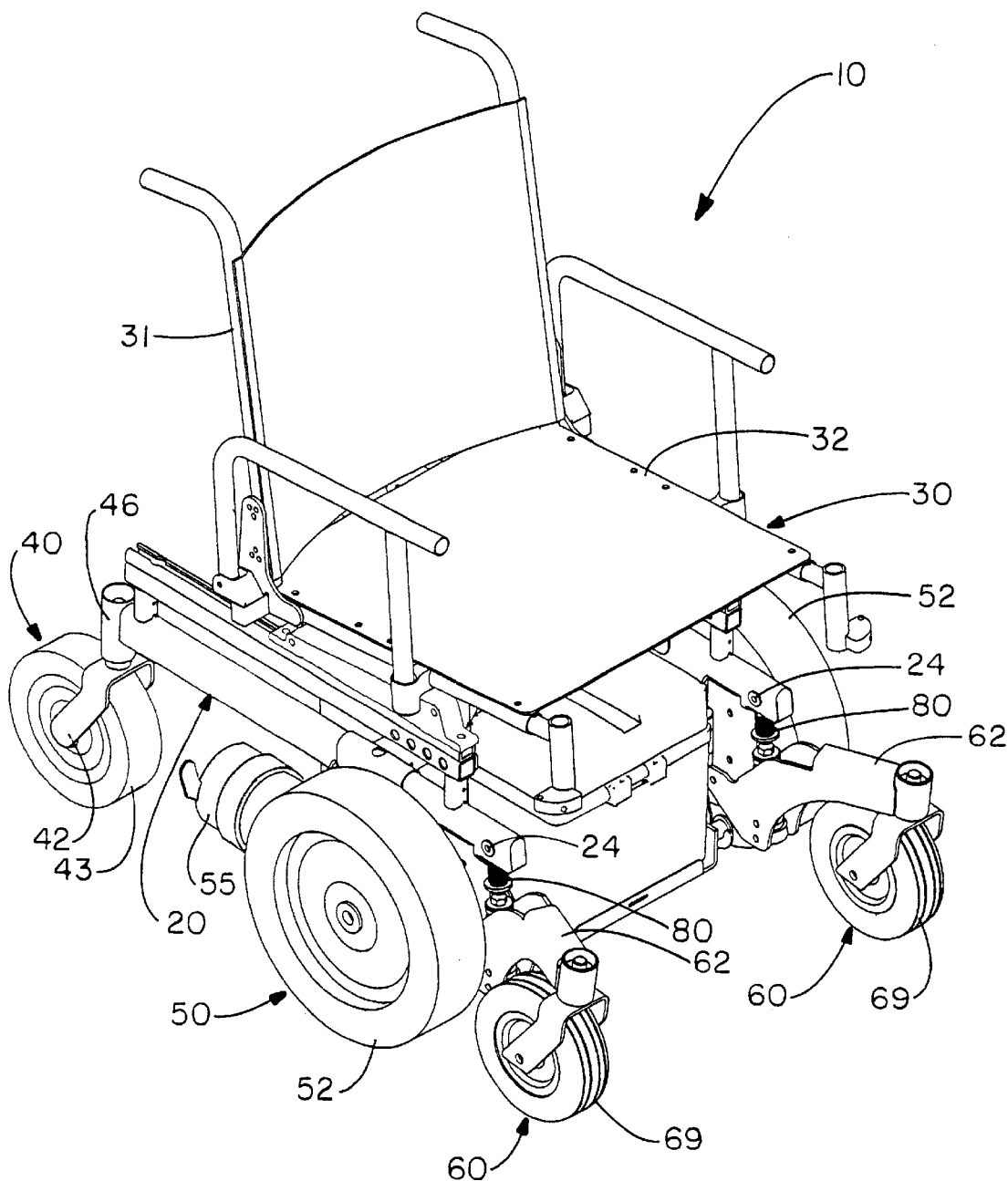
FIG. 7 is a perspective view of a rigid mid-wheel drive wheelchair of the present invention having at least one resiliently biased ground engaging front caster wheel having a multiple bias suspension and anti-tip assembly.
Figure 8:
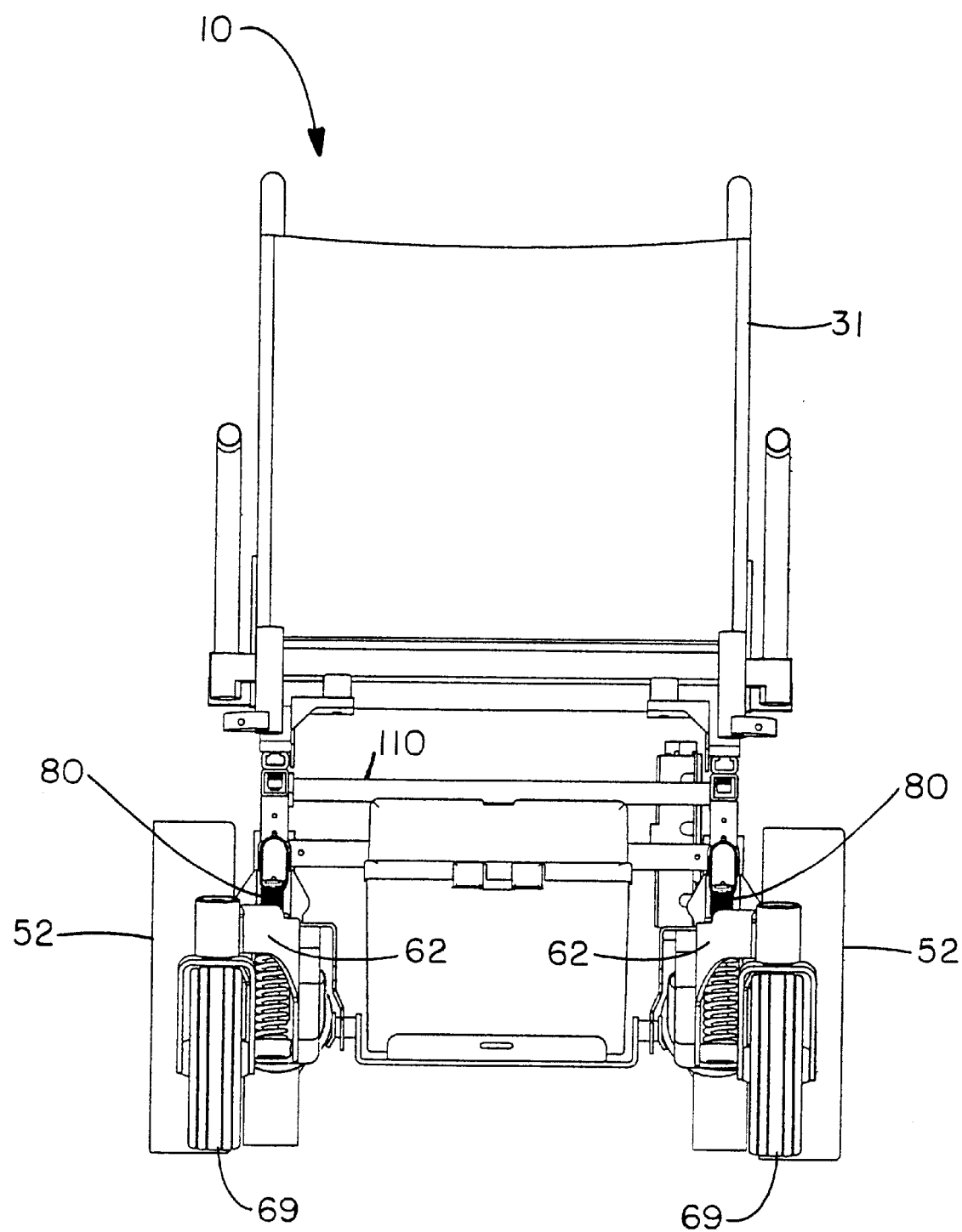
FIG. 8 is a front elevation view of the wheelchair of FIG. 8.

Another embodiment of the present invention relates to a rigid mid-wheel drive wheelchair as shown in FIGS. 7 and 8. As seen in FIG. 8, both sides of the wheelchair are rigidly connected as through cross bar 110. Other than not being foldable, the various components of this wheelchair as shown in FIGS. 7 and 8 are generally the same as those described with respect to FIGS. 1 through 6. Naturally, the multiple spring suspension assembly described hereinabove is the same.

While in accordance with the patent statutes, the best mode and preferred embodiment have been set forth, the scope of the invention is not limited thereto, but rather by the scope of the attached claims.

What is claimed is:

1. A wheelchair, comprising:
a frame;
a seat assembly operatively connected to said frame;
a plurality of drive wheels operatively connected to said frame;
at least one rear caster wheel operatively connected to said frame; and
at least one front wheel assembly resiliently and pivotally connected to said frame by a multiple compression range suspension assembly having at least two biasing members, said multiple compression range suspension assembly adapted to biasly urge said front wheel into contact with a surface, wherein each said biasing member of said suspension assembly has a compression range which can be separate from or can overlap the at least one other biasing member, wherein said suspension assembly has an upper housing containing a substantially vertically extending elongated slot therein, and wherein a pin connects said suspension assembly to said wheelchair frame, and wherein said pin extends through and is movable substantially vertically upwardly and downwardly within said slot.

2. A wheelchair according to claim 1, wherein said drive wheels are adapted to be manually driven or power driven.

3. A wheelchair according to claim 2, wherein said biasing members are springs, wherein said front wheel is a caster wheel, wherein said suspension assembly comprises a base, a shaft, and an upper bracket, wherein said shaft is connected to said frame by said bracket and to said front caster wheel arm by said base, and wherein said suspension assembly is resiliently biased by at least one of a primary and a secondary spring.

4. A wheelchair according to claim 3, wherein said primary spring and said secondary spring are substantially axially aligned with each other.

5. A wheelchair according to claim 3, wherein said primary spring and said secondary spring are adapted to compress upon upward movement of said front caster wheel, and wherein said secondary spring has a higher compression range than said primary spring.

6. A wheelchair according to claim 5, wherein said primary spring has a predetermined compression and wherein the compression of said secondary spring can be adjusted.

7. A wheelchair according to claim 4, wherein said primary spring and said secondary spring have a different range of compression.

8. A wheelchair according to claim 1, wherein said suspension assembly is adapted to have said pin located approximately in the middle portion of said upper slot when said biased front caster wheel is on a flat surface with an occupant residing therein.

9. A wheelchair according to claim 1, wherein said primary spring is capable of providing an initial biasing resistance and wherein said secondary spring is capable of providing a substantially subsequent biasing resistance.

10. A wheelchair according to claim 1, wherein said rear caster wheel is directly connected to said frame, wherein said wheelchair is a power driven wheelchair, wherein said wheelchair has two front caster wheels with each caster wheel having said multiple suspension assembly.

11. A wheelchair according to claim 9, wherein said rear caster wheel is directly connected to said frame, wherein said wheelchair is a power driven wheelchair, wherein said wheelchair has two front caster wheels with each caster wheel having said suspension assembly.

12. An anti-tip wheelchair, comprising:
   a frame;
   at least a power driven drive wheel operatively connected to said frame and at least a rear caster wheel operatively connected to said frame;
   at least one anti-tip wheel located forward of said drive wheel, said anti-tip wheel pivotally attached to said frame by a caster arm, said anti-tip wheel adapted to be resiliently biased on a riding surface by a multiple compression range suspension assembly, said multiple compression range suspension assembly pivotally connected at substantially one end to said frame and pivotally connected at substantially the remaining end to said caster arm, said multiple compression range suspension assembly having at least two biasing members, wherein each said biasing member has a compression range which can be separate from or can overlap the range of the at least one other biasing member, wherein said suspension assembly has an upper housing containing a substantially vertically extending elongated slot therein, wherein an upper pin connects said suspension assembly to said wheelchair frame, and wherein said upper pin extends through and is movable substantially vertically upwardly and downwardly within said slot.

13. An anti-tip wheelchair according to claim 12, wherein said suspension assembly has a base having an opening therein, and a lower pin residing within said base opening and operatively connecting said suspension assembly to said caster arm.

14. An anti-tip wheelchair according to claim 13, said at least two biasing members comprising at least a primary spring adapted to provide an initial anti-tip biasing resistance and a secondary spring adapted to provide a substantially subsequent anti-tip biasing resistance.

15. An anti-tip wheelchair according to claim 14, wherein said primary spring and said secondary spring are axially aligned.

16. An anti-tip wheelchair according to claim 15, wherein said secondary spring has a higher compression range than said primary spring.

17. An anti-tip wheelchair according to claim 16, including two anti-tip wheels located forward of said drive wheel, wherein said secondary spring is adapted to provide a bias resistance after said primary spring is fully compressed.

18. An anti-tip wheelchair according to claim 12, wherein said anti-tip wheel has a caster stem operatively connected to said caster arm, and wherein an axis of said caster stem is rearwardly aligned from an angle of about 1 to about 25 degrees with respect to vertical.

19. A wheelchair comprising:
   a frame;
   a seat supported by said frame;
   at least two drive wheels which support said frame; and
   at least one caster member pivotally jointed to said frame by a swing arm which is biased toward the ground by a multiple compression range suspension assembly, wherein said multiple compression range suspension assembly contains two biasing members each having compression ranges which can be separate from each other or can overlap, wherein said biasing members are a primary spring and a secondary spring, wherein said suspension assembly comprises a base, a shaft, and an upper bracket, wherein said suspension assembly has an upper housing containing a substantially vertically extending elongated slot therein, and wherein a pin connects said suspension assembly to said wheelchair frame and wherein said pin extends through and is moveable substantially vertically upwardly and downwardly within said slot, wherein said secondary spring has a higher compression range than said primary spring, and wherein said secondary spring is adapted to provide a bias resistance after said primary spring is substantially fully compressed and said pin has traveled to a lower end of said slot.

20. A wheelchair according to claim 19, wherein said drive wheels are adapted to be manually driven or power driven.

21. A wheelchair according to claim 20, wherein said primary spring and said secondary spring are substantially axially aligned with each other.

22. A wheelchair according to claim 21, wherein said primary spring has a predetermined compression and wherein the compression of said secondary spring can be adjusted.

* * * * *